Sept. 6, 1966 W. LA BADIE 3,271,236
METHOD AND APPARATUS FOR THE ELECTRICAL LOOSENING OF THE BOND
BETWEEN A PIPE AND A MANDREL DURING THE WINDING OF
THE PIPE ON THE MANDREL
Filed Oct. 31, 1963 2 Sheets-Sheet 1
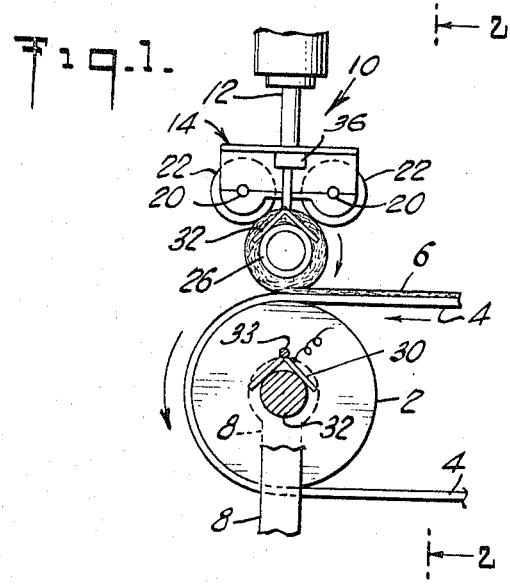
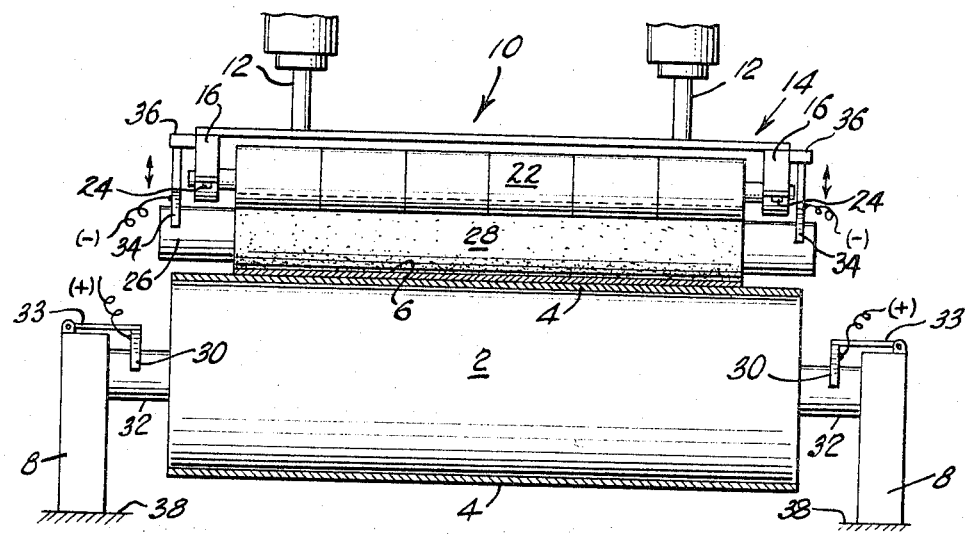
INVENTOR
WILLIAM LA BADIE
BY John A. McKinney
ATTORNEY

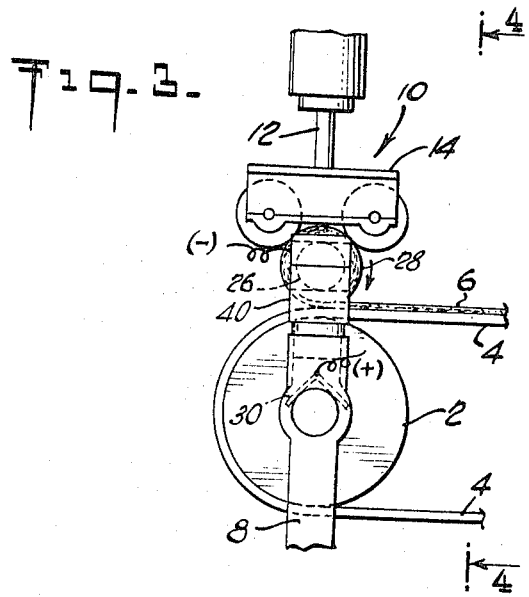
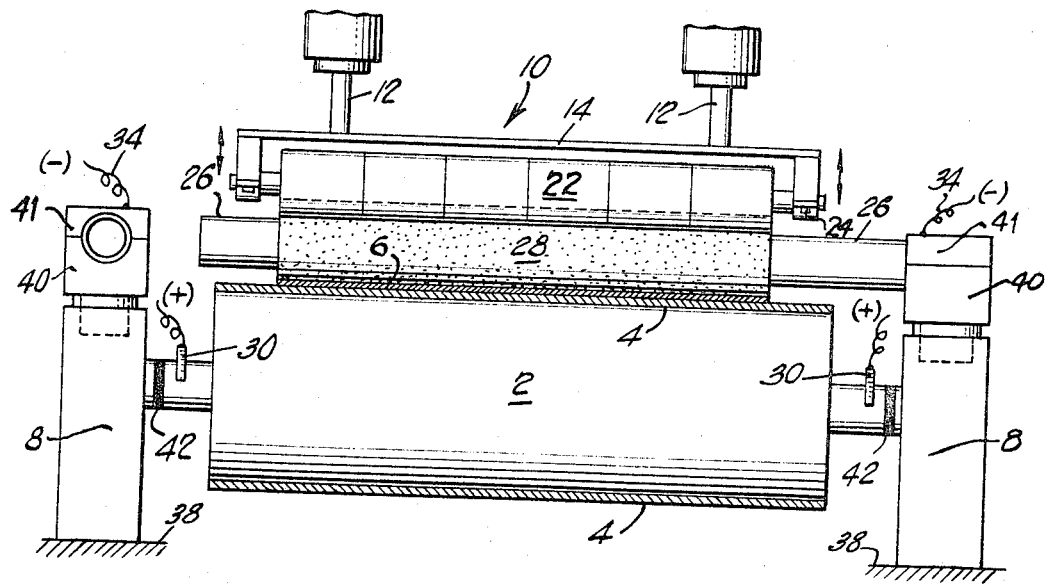
INVENTOR.
WILLIAM LaBADIE

United States Patent Office 3,271,236
Patented Sept. 6, 1966

3,271,236
METHOD AND APPARATUS FOR THE ELECTRICAL LOOSENING OF THE BOND BETWEEN A PIPE AND A MANDREL DURING THE WINDING OF THE PIPE ON THE MANDREL
William La Badie, New Brunswick, N.J., assignor to Johns-Manville Corporation, New York, N.Y., a corporation of New York
Filed Oct. 31, 1963, Ser. No. 320,287
9 Claims. (Cl. 162—122)

This invention relates to method and apparatus for the manufacture of articles which are formed on a mandrel from a wet stock and more particularly is directed to the manufacture of asbestos-cement pipe from a wet asbestos-cement pulp. More specifically, the invention is directed to method and apparatus for the manufacture of abestos-cement pipe which includes the loosening of the wet cementitious pipe from the mandrel. While the invention is described with reference to the formation of abestos-cement pipe, it is understood that the invention is applicable in principle to other articles similarly formed on a mandrel.

The conventional method of manufacturing asbestos-cement pipe involves winding a wet sheet of asbestos-cement pulp on a rotating, hollow mandrel while applying high pressure thereto. When a pipe of suitable wall thickness has been formed, the mandrel is removed from the pressure applying means and the formed pipe is then removed from the mandrel for curing. Because of the high pressure applied during the winding of the sheet stock on the mandrel, a firm bond develops between the pipe and the mandrel and it is necessary to break this bond to permit the removal of the wet asbestos-cement pipe from the mandrel without detrimental damage to the pipe.

Many attempts have been made to devise a method of loosening the formed pipe from its mandrel without distorting the pipe or cracking or otherwise damaging its inner surface. Prior systems which function to loosen successfully the pipe from the mandrel so that the pipe may be removed therefrom are illustrated in U.S. Patents Nos. 2,892,750; 2,992,157 and 3,193,450. The systems described in the above identified patents and application, while generally acceptable for a commercial operation, are not completely satisfactory since it is necessary to utilize additional apparatus, separate from that on which the pipe is formed, to loosen the pipe from the mandrel. Besides the additional apparatus, there is required an extra operation in the manufacture of the pipe. Also, the use of the additional apparatus necessitates a time interval between the formation of the wet pipe and the loosening operation and since the pipe in many instances includes a very fast setting cement, this time interval may allow the material in the pipe to set partially and thus make loosening difficult.

It is an object of the present invention to provide method and apparatus for the manufacture of pipe including the loosening of the pipe during the manufacturing thereof from the mandrel on which it is formed.

It is another object of the present invention to provide method and apparatus for the loosening of pipe from the mandrel on which it is formed utilizing an electrical loosener having a constantly new electrode.

The foregoing objects are accomplished in accordance with the instant invention by a system wherein electrical contact means are connected to the mandrel and the anvil roll of a conventional pipe forming apparatus so as to cause a flow of electric current through the wall of the pipe so as to loosen the pipe from the mandrel while it is being formed. In the preferred embodiment of the invention, the positive terminal of an electrical direct current source is connected to the anvil roll of a conventional pipe forming apparatus and the negative terminal of the electrical direct current source is connected to the mandrel on which the pipe is being formed while the pipe is between the press section and the anvil roll with the anvil roll being connected to the ground. The preferred embodiment of the invention is directed to the formation of asbestos-cement pipe by conventional apparatus of the type wherein a wet stock of asbestos, cement and water is deposited on an endless conveyor belt which is trained over an anvil roll. A press section is located adjacent the anvil roll and cooperates therewith to form a pipe of asbestos-cement on a mandrel which is positioned between the anvil roll and the press section. The wet stock of asbestos, cement and water is bonded to the mandrel and a plurality of layers of wet asbestos-cement are formed thereon by the rotation of the mandrel while in position between the anvil roll and the press section. The wet stock is condensed on the mandrel and bonded thereto by the pressure applied through the press section. At some time during the formation of the pipe on the mandrel, which in the preferred embodiment is for several complete revolutions of the mandrel near the end of the pipe forming cycle, a direct electrical current is caused to flow from the anvil roll through the slurry, which because of its constituents acts as an electrically conductive solution, on the conveyor belt and the pipe wall to the mandrel to effect the loosening of the pipe on the mandrel. Thus, the present invention eliminates the necessity for additional apparatus and operations to effect the loosening of the pipe from the mandrel on which it is formed by providing method and apparatus for the loosening of the pipe from the mandrel during the formation thereof.

The invention will be more fully understood and further objects and advantages thereof will become apparent when reference is made to the following detailed description of a preferred embodiment of the invention and the accompanying drawing in which:

FIG. 1 is a side elevational view of a schematic illustration of apparatus to be used in accordance with the instant invention;

FIG. 2 is a sectional view taken on the plane passing through the line 2—2 of FIG. 1;

FIG. 3 is a side elevational view of a schematic illustration of another type of apparatus to be used in accordance with the instant invention; and FIG. 4 is a sectional view taken on the plane passing through the line 4—4 of FIG. 3.

Referring to the drawing, there is illustrated in FIG. 1 a conventional apparatus for forming a pipe on a mandrel and in the preferred embodiment of the invention comprises an anvil roll 2 over which there travels a felt 4 carrying a wet stock 6 of asbestos, cement, water and other materials which stock is deposited thereon by conventional apparatus (not shown) such as a cylinder mold or molds of the type illustrated in Rembert U.S. Patent No. 2,322,592. The anvil roll 2 is a rigid element capable of withstanding pipe forming pressures without flexing, is mounted for rotation in fixed supports 8 and is rotated by conventional means (not shown) to drive the felt 4 in the direction indicated by the arrow. In the preferred embodiment of the invention, the anvil roll 2 comprises an electrically conductive material such as iron. Positioned above the anvil roll 2 is a press section 10 which is moved toward and away from the anvil roll 2 by mechanical means (not shown). A plurality of hydraulic means 12 are used to apply pressure to the pipe being formed as described below. In the preferred embodiment of the invention, the press section 10 comprises a heavy bar 14 secured to the hydraulic means 12 and having depending end portions 16 arranged to provide journals for the shafts 20 of two rows of press rolls 22. The depending portions 16 may each be formed of parts divided on a line bisecting shafts 20 and secured together by bolts 24. In the preferred embodiment, the rolls 22 are covered with a rubber-like material. If desired the rolls 22 may be of the type illustrated in FIG. 2 of U.S. Patent No. 3,000,776 and mounted in a similar manner.

In the conventional manner of forming pipe with the above described apparatus, the press section 10 is moved away from the anvil roll 2 and a hollow steel mandrel 26 is placed on the anvil roll 2. The mandrel 26 is supported only by resting on the anvil roll 2. The press section 10 is moved toward the anvil roll 2 so that the mandrel 26 is between the anvil roll 2 and the press rolls 22. The anvil roll 2 is then rotated in a direction indicated by the arrows, causing movement of the felt 4 by the anvil roll 2. The wet stock 6 on the felt 4 will adhere to the mandrel 26 and will be wound upon the mandrel 26 as the mandrel is caused to rotate by the movement of the felt 4. The wet stock 6 is then condensed thereon by the press rolls 22 and is bonded to the mandrel to form a pipe 28. In conventional machines, the press rolls 22 are arranged to exert pressures of from about 300 to 30 pounds per line inch of pipe length. In forming asbestos-cement pressure pipe, the press section exerts about 300 pounds per line inch of pipe at the beginning of the forming cycle and this pressure is gradually reduced during the forming cycle until it reaches about 150 pounds per line inch of pipe adjacent the end of the forming cycle. In forming asbestos-cement sewer pipe, the pressures exerted by the press section on the wall of the pipe throughout the formation of the pipe are from about 100 pounds per line inch of pipe at the beginning of the forming cycle to about 50 pounds per line inch of pipe adjacent the end of the forming cycle. As a result of these pressures, a considerable amount of water is squeezed from the wet stock 6 at the nip between the pipe 28 on the mandrel 26 and the anvil roll 2. The mandrel 26 is rotated until a plurality of laminations from the wet stock 6 have been formed thereon.

In view of the high pressures exerted on the mandrel during the formation of the pipe thereon, it is conventional to form the mandrels from a material such as steel. Thus, in the preferred embodiment of the invention the mandrels 26 comprise a suitable steel which provides a continuous peripheral surface which is electrically conductive. However, it is to be understood that it is within the limits of the instant invention to construct the mandrel from any suitable type of material which can stand the pressures involved as long as the peripheral surface, or portions thereof, is electrically conductive.

In the embodiment of the invention illustrated in FIGS. 1 and 2, an electrode 30 is placed into electrical contact or electrical conducting relation with each end of the anvil roll 2 preferably by contacting the axle 32 of the anvil roll, which serves as an electrical conductor. The electrodes 30 are connected to any suitable means for moving them into contact with the axle 32 of the anvil roll such as the pivoted arms 33. A pair of electrodes 34 are mounted for movement into and out of contact with the free ends of the mandrel 26 by any type of conventional means such as the control mechanisms 36 secured to the press section 10. In the preferred embodiment of the invention, the electrodes 30 are connected electrically to the positive terminal of an electrical direct current source such as a D.C. generator of a rated value of 60 kilowatts and 350 volts and which can be regulated as desired, and electrodes 34 are connected electrically to the negative terminal of the same electrical direct current source. A conventional switch (not shown) is utilized to complete the electric circuit. The anvil roll 2, through the electrically conductive supports 8, is connected electrically to ground 38 while the press section 10 is insulated electrically from the machine frame such as by the rubber-like material on the peripheral surfaces of the press rolls 22. Also, the supports for the electrodes 34 are insulated electrically from the machine frame.

In accordance with the instant invention the material from which the pipe is formed and the conveyor belt are electrically conductive. In the preferred embodiment of the invention, the material for forming the pipe comprises a wet stock comprising asbestos, hydraulic cement and water. Because of the physical and chemical composition of this wet stock, it is electrically conductive. When the wet stock passes between the mandrel and the anvil roll while the press rolls are exerting pressure thereon, considerable adulterated water is pressed from the wet stock and saturates the conveyor belt. The physical and chemical characteristics of this adulterated water make the conveyor belt at this point electrically conductive. Although the instant invention is directed primarily to the formation of wet cementitious pipe, it has application to the formation of any type of pipe on a mandrel where the various components are electrically conductive and it is necessary to loosen the bond between the pipe and the mandrel to remove the mandrel from the pipe.

When it is desired to loosen the pipe 28 from the mandrel 26, the electric circuit is completed and an electric direct current flows from the anvil roll 2, through the conveyor belt 4, the wet stock 6 and the pipe 28 to the mandrel 26. The amount of voltage supplied to the electrical direct current source, the current flowing through the circuit and the time during which the current flows vary with the forming time, the diameter, the wall thickness and the density of the pipe and the type of materials in the pipe. Also, even when making the same type of pipe and applying the same voltage to the circuit, the current passing through the circuit may vary because of the physical and electrical characteristics of the materials in the pipe. The data in the following table was obtained from the tests conducted during the manufacture of various sizes and types of asbestos-cement pipe:

TABLE I

| Pipe | Form Time (sec.) | Felt Speed (ft./min.) | Loosener | | Loosener Application | | | Remarks |
|---|---|---|---|---|---|---|---|---|
| | | | Voltage (volts) | Current (amps.) | Start[1] | End[1] | Total Time (sec.) | |
| 12″ Class 3300 | 81.0 | 108 | 210 | 255 | 51.0 | 81.0 | 30 | Too loose. |
| Do | 81.0 | 108 | 180 | 260 | 58.0 | 81.0 | 23 | Loosened O.K. |
| Do | 81.0 | 108 | Nothing | | | | | Couldn't pull. |
| 12″ Class 1500 | 90.0 | 84 | 175 | 250 | 65.0 | 90.0 | 25 | Loosened O.K. |
| Do | 90.0 | 84 | Nothing | | | | | Couldn't pull. |
| Do | 90.0 | 84 | 175 | 210 | 73.0 | 90.0 | 17 | Loosened O.K. |
| Do | 90.0 | 84 | 175 | 200 | 82.0 | 90.0 | 8 | Do. |
| Do | 69.0 | 98 | 240 | 160 | 54.0 | 69.0 | 15 | Do. |
| Do | 69.0 | 98 | 240 | 140 | 54.0 | 69.0 | 15 | Do. |
| Do | 69.0 | 98 | Nothing | | | | | Couldn't pull. |
| 10″ Class 1500 | 60.0 | 98 | 225 | 230 | 52.0 | 60.0 | 8 | Loosened O.K. |
| Do | 60.0 | 98 | 225 | 280 | 52.0 | 60.0 | 8 | Do. |
| 16″ Class 3300 | 145.0 | 95 | Nothing | | | | | Couldn't pull. |
| Do | 145.0 | 95 | 110 | 160 | 30.0 | 40.0 | 10 | Pipe blown from mandrel. |
| Do | 145.0 | 95 | 110 | 160 | 125.0 | 135.0 | 10 | Loosened O.K. |
| Do | 145.0 | 95 | 110 | 160 | 115.0 | 125.0 | 10 | Do. |
| Do | 145.0 | 95 | 110 | 160 | 110.0 | 145.0 | 35 | Do. |
| 10″ Class 150 | 97.0 | 95 | 130 | 210 | 92.0 | 97.0 | 5 | Couldn't pull. |
| Do | 97.0 | 95 | Nothing | | | | | Do. |
| Do | 97.0 | 95 | 130 | 210 | 76.0 | 97.0 | 21 | Loosened O.K. |
| Do | 95.0 | 95 | 135 | 260 | 80.0 | 95.0 | 15 | Do. |

[1] The numbers in these columns represent the time in seconds from the beginning of the forming cycle.

The foregoing examples clearly show that the system described in the instant application functions to loosen successfully the bond between the mandrel and the pipe so that the mandrel can be pulled from the pipe. Also, the examples show that without such loosening, the mandrel can not be pulled from the pipe. These examples also illustrate the wide ranges relative to the type of pipe, the amount of voltage and current, the time the voltage is applied, and the period when the voltage is applied involved in effecting a loosening of the bond between the mandrel and the pipe. Thus, in some instances the voltage was applied for a period of time right up to the end of the forming cycle while at other times at least one complete revolution of the mandrel was made after the application of the voltage had been discontinued. In some instances the voltage and current were too great or applied too early and resulted in loosening the pipe too much. This resulted in pipe that was not acceptable because their dimensions were outside of the tolerances allowed. In other instances, the current was not applied long enough or at the proper period of time and therefore, the bond between the mandrel and the pipe was not loosened. However, the tests which produced the results shown by these tables establish that the system disclosed herein will loosen successfully the bond between the pipe and the mandrel so that the mandrel may be pulled from the pipe with no serious damage to the pipe. When it is desired to use the system of the instant invention in the manufacture of a particular type of pipe, the various practical limits effecting the loosening of the bond between the mandrel and the pipe may be readily determined. It is understood that the foregoing examples are given for illustration purposes only and that the invention is not to be limited thereto.

The apparatus illustrated in FIGS. 3 and 4 is generally similar to the apparatus of FIGS. 1 and 2, and the corresponding parts have been similarly numbered. In FIGS. 3 and 4, the mandrel 26 is mounted for rotation in either one of the journals 40 which are pivotally mounted on the supports 8 for movement about an axis generally perpendicular to the axis of the anvil roll 2. As illustrated in FIG. 4, one end of the mandrel has been inserted into one of the mandrel clamping jaws 41 in each of the journals 40 and has been swung into pipe forming position between the press rolls 22 and the anvil roll 2 while the other journal, which at that time does not participate in supporting the mandrel already in the pipe forming position, is in position to receive a new mandrel. Also, the journals 40 are designed for vertical reciprocal movement to allow for different diameters of mandrels and for the formation of the pipe on the mandrel 26. It is to be understood that the journals 40 and associated structures therewith are portions of conventional machines which have only been illustrated schematically in the instant invention since their particular structure forms no part of the instant invention. In the apparatus illustrated in FIGS. 3 and 4, the mandrel 26 through the journal 40 which is supporting it and through supports 8 is connected electrically to ground 38 while the anvil roll 2 is insulated electrically from ground such as by electrical insulation 42. Therefore, the electrodes 30 are positioned on the anvil roll 2 with the insulation 42 between the electrodes and the supports 8. As in the apparatus in FIGS. 1 and 2, the electrodes 30 are connected to the positive terminal of an electrical direct current source (not shown) and the electrodes 34 are connected to the negative terminal of said electrical direct current source. Except for this relative change in ground connection, the insulating from ground of the anvil roll and the different manner of supporting the mandrel, the apparatus of FIGS. 3 and 4 functions in every respect similar to the apparatus described in FIGS. 1 and 2.

In the preferred embodiment of the invention, the anvil roll is connected to the positive terminal of an electrical direct current source and the mandrel is connected to the negative terminal of the electrical direct current source. While it may be possible to loosen pipe from mandrels using other types of electrical circuits, experience has demonstrated that because of many factors, including particularly the physical characteristics of the standard mandrels, it is preferable with the production equipment presently in use to employ an electrical direct current flowing as described above in the preferred embodiment of the invention for effecting the loosening of the wet asbestos-cement pipe from the mandrel. However, if an advancement in the art brings about a change in mandrels, it would be within the scope of this invention to use direct current flowing in a direction from said mandrel to said pipe or low frequency square wave alternating current to effect the loosening of the pipe from the mandrel.

The method and apparatus of the instant invention have functioned remarkably well to loosen the bond between the mandrel and the wet pipe. While the exact reason for this improvement is not known, there are factors associated with the instant invention which are not present in other types of electric loosening. For instance, there is associated with the loosening a new type of calendering action since the wet pipe during the loosening action is subjected to the extremely high forming pressures, described above as being of a nature of about 300 to 50 pounds per line inch, normally associated only with the formation of the pipe. Another reason is associated with the water which is present at the nip between the anvil roll and the wet pipe while the pressure is being exerted on the pipe wall. In this condition the pipe wall is in its most condensed and most saturated condition and probably offers its lowest resistance against electrical current flow. Also, the adulterated water which is present saturates the conveyor belt, which is also highly condensed by the pressures associated with the formation of the pipe, and floods the adjacent surface of the anvil roll so that there is little or no resistance by these elements against electrical current flow.

In order to test the effectiveness of the method and apparatus of the instant invention, a special test run was made. The peripheral surfaces of ten conventional mandrels were shot blasted to insure the formation of a tight bond between the mandrel and the wet pipe in the manufacture of pipe as described above. Pipes of the type identified as 12" Class 1500 were then formed on these mandrels and subjected to three different types of loosening, i.e., knifing, roll type electric loosening and the electric loosening of the instant invention. The results of this test are given in the following table:

TABLE II

| Type of Loosener | Form Time (sec.) | Mandrel (rev./sec.) At Felt Speed 80'/min. | Felt Speed (ft./min.) | Loosener | | Loosener Application Total Time (sec.) | Effective Loosening |
|---|---|---|---|---|---|---|---|
| | | | | Voltage (volts) | Current (amps.) | | |
| Instant Inv | 84 | 0.38 | 98 | 225 | 300 | 8 | Yes (No mushroom). |
| Do | 84 | 0.38 | 98 | 225 | 300 | 8 | Do. |
| Roll | 84 | 0.38 | 98 | 250 | 110 | 20 | No (Couldn't pull). |
| Do | 84 | 0.38 | 98 | 248 | 110 | 30 | Do. |
| Knife | 84 | 0.38 | 98 | | | | Do. |
| Instant Inv | 84 | 0.38 | 98 | 225 | 280 | 10 | Yes (No mushroom). |
| Do | 84 | 0.38 | 98 | 225 | 270 | 7 | Do. |
| Knife | 84 | 0.38 | 98 | | | | No (Couldn't pull). |
| Roll | 84 | 0.38 | 98 | 245 | 100 | 30 | Do. |
| Do | 84 | 0.38 | 98 | 240 | 120 | 30 | Do. |

These results clearly demonstrate the advantage of the electric loosening of the instant invention. The pipe subjected to the knifing and roll type electric loosening could not be pulled from the mandrels while the pipe loosened in accordance with the disclosure in the instant application were pulled from the mandrels with no damage to the pipe.

The method and apparatus of the instant invention function to effect a more uniform loosening of the pipe from the mandrel along the entire length and circumference of the pipe. This allows for the formation of a very tight pipe, i.e., one that is very close to the actual outside configuration of the mandrel. Also, this uniform loosening of the pipe allows for the pulling of the pipe from the mandrel with a minimum of force so that there is little or no mushrooming of the pipe end. Also, the pipe itself will be more round and have smoother interiors than pipe loosened with other types of loosening methods and mechanisms. Because of the added advantages set forth above, the use of the invention will substantially reduce the number of rejects and might possibly eliminate all rejects based on incomplete or excessive loosening of the pipe from the mandrel.

While the invention has been described in rather full detail, it will be understood that these details need not be strictly adhered to and that various changes and modifications may suggest themselves to one skilled in the art, all falling within the scope of the invention as defined by the subjoined claims.

What I claim is:
1. A method for manufacturing a pipe comprising:
   (a) supporting a mandrel having an electrically conductive surface for rotation about its axis,
   (b) winding a sheet of electrically conductive material around said mandrel during the rotation thereof to form a pipe comprising a plurality of laminations on said mandrel,
   (c) applying pressure during said winding operation causing said pipe to bond to said mandrel, and
   (d) passing an electric current through said pipe and said electrically conductive surface of said mandrel after at least one lamination has been formed on and bonded to said mandrel and during at least a portion of the winding of the remaining portion of said sheet on said mandrel to loosen said bond between said mandrel and said pipe.

2. A method as defined in claim 1 and further comprising:
   (a) passing said electric current through said pipe and said electrically conductive surface of said mandrel during at least one complete revolution of said mandrel during said winding of said sheet on said mandrel.

3. A method as defined in claim 1 and further comprising:
   (a) passing said electric current through said pipe and said electrically conductive surface of said mandrel during a plurality of revolutions of said mandrel during said winding of said sheet on said mandrel.

4. A method for manufacturing a pipe comprising:
   (a) supporting a mandrel having an electrically conductive surface for rotation about its axis,
   (b) contacting said mandrel with a sheet of electrically conductive material,
   (c) forming a plurality of laminations on said mandrel by winding said sheet of electrically conductive material around said mandrel during the rotation thereof during a forming cycle to form a pipe on said mandrel,
   (d) applying pressure during said winding operation causing said pipe to bond to said mandrel,
   (e) passing an electric current through said pipe and said electrically conductive surface of said mandrel after at least one lamination has been formed on and bonded to said mandrel and during at least one complete revolution of said mandrel and said pipe during the winding of the remaining portion of said sheet on said mandrel to loosen said bond between said mandrel and said pipe, and
   (f) forming at least one more complete lamination on said mandrel after loosening said bond between said mandrel and said pipe.

5. A method as defined in claim 4 and further comprising:
   (a) passing said electric current through said pipe and said electrically conductive surface of said mandrel during a plurality of revolutions of said mandrel and said pipe during said winding of said sheet on said mandrel.

6. A method for manufacturing a pipe comprising:
   (a) supporting a mandrel having an electrically conductive surface for rotation about its axis, (b) contacting said mandrel with a sheet of electrically conductive material,
(c) forming a plurality of laminations on said mandrel by winding said sheet of material around said mandrel during the rotation thereof during a forming cycle to form a pipe on said mandrel,
(d) applying pressure during said winding operation causing said pipe to bond to said mandrel, and
(e) passing an electric current through said pipe and said electrically conductive surface of said mandrel after a plurality of laminations have been formed on and bonded to said mandrel and during a plurality of revolutions of said mandrel immediately prior to the end of said forming cycle and during said winding of said sheet on said mandrel to loosen said bond between said mandrel and said pipe.

7. Apparatus for manufacturing pipe comprising:
(a) means for supporting a mandrel having an electrically conductive surface for rotation about its axis,
(b) means for winding a sheet of electrically conductive material around said mandrel to form a pipe on said mandrel,
(c) means for applying pressure during said winding operation causing said pipe to bond to said mandrel, and
(d) means for passing an electric current through said pipe and said electrically conductive surface of said mandrel during said winding of said sheet on said mandrel to loosen said bond between said mandrel and said pipe.

8. Apparatus for manufacturing said pipe comprising:
(a) means for supporting a mandrel having an electrically conductive surface for rotation about its axis,
(b) means for winding a sheet of electrically conductive material around said mandrel to form a pipe on said mandrel,
(c) means for applying pressure during said winding operation causing said pipe to bond to said mandrel, and
(d) means for passing an electric direct current through said pipe and said electrically conductive surface of said mandrel during said winding of said sheet on said mandrel to loosen said bond between said mandrel and said pipe.

9. Apparatus as defined in claim 8 wherein:
(a) said electrically conductive surface of said anvil roll is connected to the positive terminal of said electrical direct current source, and
(b) said electrically conductive surface of said mandrel is connected to the negative terminal of said electrical direct current source.

References Cited by the Examiner

UNITED STATES PATENTS

| | | | |
|---|---|---|---|
| 2,182,353 | 12/1939 | Rembert et al. | 162—122 |
| 2,892,750 | 6/1959 | Ramm | 162—192 |

DONALL H. SYLVESTER, *Primary Examiner.*

S. LEON BASHORE, *Examiner.*